United States Patent
Lauder

(10) Patent No.: US 10,723,474 B2
(45) Date of Patent: Jul. 28, 2020

(54) VARIABLE GEOMETRY ENGINE INLET FOR HIGH SPEED AIRCRAFT

(71) Applicant: Sikorsky Aircraft Corporation, Stratford, CT (US)

(72) Inventor: Timothy F. Lauder, Oxford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 400 days.

(21) Appl. No.: 15/603,895

(22) Filed: May 24, 2017

(65) Prior Publication Data
US 2018/0339784 A1    Nov. 29, 2018

(51) Int. Cl.
| | | |
|---|---|---|
| *B64D 33/02* | (2006.01) | |
| *B64C 21/08* | (2006.01) | |
| *B64C 21/10* | (2006.01) | |
| *B64C 27/06* | (2006.01) | |
| *B64C 27/82* | (2006.01) | |

(52) U.S. Cl.
CPC .............. *B64D 33/02* (2013.01); *B64C 21/08* (2013.01); *B64C 21/10* (2013.01); *B64C 27/06* (2013.01); *B64C 27/82* (2013.01); *B64C 2230/06* (2013.01); *B64C 2230/20* (2013.01); *B64D 2033/0226* (2013.01)

(58) Field of Classification Search
CPC ............ B64D 33/02; B64D 2033/0226; B64C 21/08; B64C 21/10; B64C 27/06; B64C 27/82; B64C 2230/06; B64C 2230/20
See application file for complete search history.

(56) References Cited

U.S. PATENT DOCUMENTS

| | | | |
|---|---|---|---|
| 3,338,049 A | 8/1967 | Fernberger | |
| 3,477,455 A | 11/1969 | Campbell | |
| 4,007,891 A * | 2/1977 | Sorensen ............... | B64D 33/02 137/15.1 |
| 4,372,505 A * | 2/1983 | Syberg ................... | B64D 33/02 244/53 B |
| 4,477,039 A * | 10/1984 | Boulton ................. | B64D 33/02 137/15.1 |
| 4,782,659 A | 11/1988 | Lewis et al. | |
| 5,174,524 A * | 12/1992 | Amneus, III .......... | B64D 33/02 137/15.1 |
| 5,337,975 A * | 8/1994 | Peinemann ............ | B64D 33/02 244/53 B |
| 6,231,006 B1 * | 5/2001 | Gruensfelder ......... | B64D 33/02 137/15.1 |
| 6,390,414 B1 | 5/2002 | Medvedev | |

(Continued)

FOREIGN PATENT DOCUMENTS

| | | | |
|---|---|---|---|
| EP | 0330782 A1 | 9/1989 | |
| EP | 2871131 A1 | 5/2015 | |
| EP | 3075663 A1 * | 10/2016 | ........... B64C 1/0009 |

OTHER PUBLICATIONS

Extended European Search Report; European Application No. 18173870.9; dated Oct. 11, 2018; 7 Pages.

*Primary Examiner* — Richard R. Green
*Assistant Examiner* — Michael A. Fabula
(74) *Attorney, Agent, or Firm* — Cantor Colburn LLP

(57) ABSTRACT

An aircraft includes an airframe, an engine mounted to the airframe, and an engine inlet for receiving an ambient airflow and providing the ambient airflow to the engine. An amount of airflow provided to the engine inlet is controllable.

14 Claims, 3 Drawing Sheets

(56) References Cited

U.S. PATENT DOCUMENTS

| | | | |
|---|---|---|---|
| 8,690,097 B1* | 4/2014 | Huynh | F02C 7/04 |
| | | | 244/53 B |
| 9,758,253 B2* | 9/2017 | Troia | B64C 23/04 |
| 2008/0283677 A1* | 11/2008 | Pederson | B64C 30/00 |
| | | | 244/73 R |
| 2011/0000548 A1* | 1/2011 | Sanders | B64D 33/02 |
| | | | 137/1 |
| 2011/0147533 A1 | 6/2011 | Goossen et al. | |
| 2015/0122954 A1* | 5/2015 | Lamb, Jr. | F02C 7/042 |
| | | | 244/76 R |
| 2015/0291288 A1* | 10/2015 | Bofill | B64D 33/02 |
| | | | 244/53 B |
| 2016/0376018 A1* | 12/2016 | Troia | B64C 23/04 |
| | | | 244/53 B |
| 2017/0066527 A1* | 3/2017 | Huynh | B64C 21/08 |

* cited by examiner

VARIABLE GEOMETRY ENGINE INLET FOR HIGH SPEED AIRCRAFT

BACKGROUND

The present disclosure relates to a high speed rotary wing aircraft, and more particularly, to the configuration of an engine inlet for a high speed rotary wing aircraft capable of traveling at speeds in excess of 200 nautical miles per hour.

An engine inlet on an aircraft is responsible for capturing a specified amount of air and transferring it to the engine where it is mixed with fuel and combusted to create the necessary power to operate the corresponding drive components associated therewith. Traditional vertical take-off and landing aircraft typically have engine inlets sized for maximum performance during take-off and hover operations which require a greater amount of air. This approach has been acceptable for conventional aircrafts due to the small difference in inlet velocity when the aircraft is in hover vs. cruising flight. However, recent advances in technology have enabled vertical take-off and landing aircraft to achieve greater speeds, and the fixed area engine inlet design has negative impacts on vehicle performance, particularly drag.

SUMMARY

According to an embodiment, an aircraft includes an airframe, an engine mounted to the airframe, and an engine inlet for receiving an ambient airflow and providing the ambient airflow to the engine. An amount of airflow provided to the engine inlet is controllable.

In addition to one or more of the features described above, or as an alternative, in further embodiments the amount of airflow provided to the engine inlet is controllable based on a flight condition of the aircraft.

In addition to one or more of the features described above, or as an alternative, in further embodiments an inlet area of the engine inlet is variable.

In addition to one or more of the features described above, or as an alternative, in further embodiments comprising a deflector mounted to the airframe upstream from the engine inlet, the deflector being operable to control the amount of airflow provided to the engine inlet.

In addition to one or more of the features described above, or as an alternative, in further embodiments the deflector is movable relative to the airframe between a first position and a second position to adjust an inlet area of the engine inlet.

In addition to one or more of the features described above, or as an alternative, in further embodiments the first position of the deflector is upstream from the second position of the deflector relative to the airflow.

In addition to one or more of the features described above, or as an alternative, in further embodiments the deflector is operable in response to a pilot command.

In addition to one or more of the features described above, or as an alternative, in further embodiments the deflector is operable automatically by a controller in response to a speed of the aircraft.

In addition to one or more of the features described above, or as an alternative, in further embodiments airflow to the engine inlet is maximized when the deflector is in the first position.

In addition to one or more of the features described above, or as an alternative, in further embodiments airflow to the engine inlet is minimized when the deflector is in the second position.

In addition to one or more of the features described above, or as an alternative, in further embodiments comprising a boundary layer diverter cavity formed in the airframe, wherein the deflector is movable to control operation of the boundary layer diverter cavity.

In addition to one or more of the features described above, or as an alternative, in further embodiments when the deflector is in the first position, airflow into the boundary layer diverter cavity is substantially blocked and the boundary layer diverter cavity is non-operational.

In addition to one or more of the features described above, or as an alternative, in further embodiments when the deflector is in the second position, the deflector is separated from the boundary layer diverter cavity airflow such that the boundary layer diverter cavity is fully operational.

In addition to one or more of the features described above, or as an alternative, in further embodiments the airframe includes an outwardly ramped surface arranged upstream from the engine inlet, the ramped surface is operable to direct the ambient airflow towards the engine inlet.

In addition to one or more of the features described above, or as an alternative, in further embodiments the engine inlet is partially submerged within the airframe.

According to another embodiment, a method of operating an aircraft includes directing an airflow towards an engine inlet, determining a flight condition of the aircraft, and controlling the airflow entering the engine inlet in response to the determined flight condition.

In addition to one or more of the features described above, or as an alternative, in further embodiments controlling the airflow entering the engine inlet includes varying an inlet area of the engine inlet.

In addition to one or more of the features described above, or as an alternative, in further embodiments the aircraft further comprises a deflector mounted to an airframe of the aircraft, and controlling the airflow entering the engine inlet includes adjusting a position of the deflector relative to the airframe.

In addition to one or more of the features described above, or as an alternative, in further embodiments the aircraft further comprises a boundary layer diverter cavity and controlling the airflow entering the engine inlet includes controlling the airflow entering the boundary layer diverter cavity.

In addition to one or more of the features described above, or as an alternative, in further embodiments the aircraft further comprises an airframe having a ramped surface arranged upstream of the engine inlet, the ramped surface being configured to direct the airflow towards the engine inlet.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
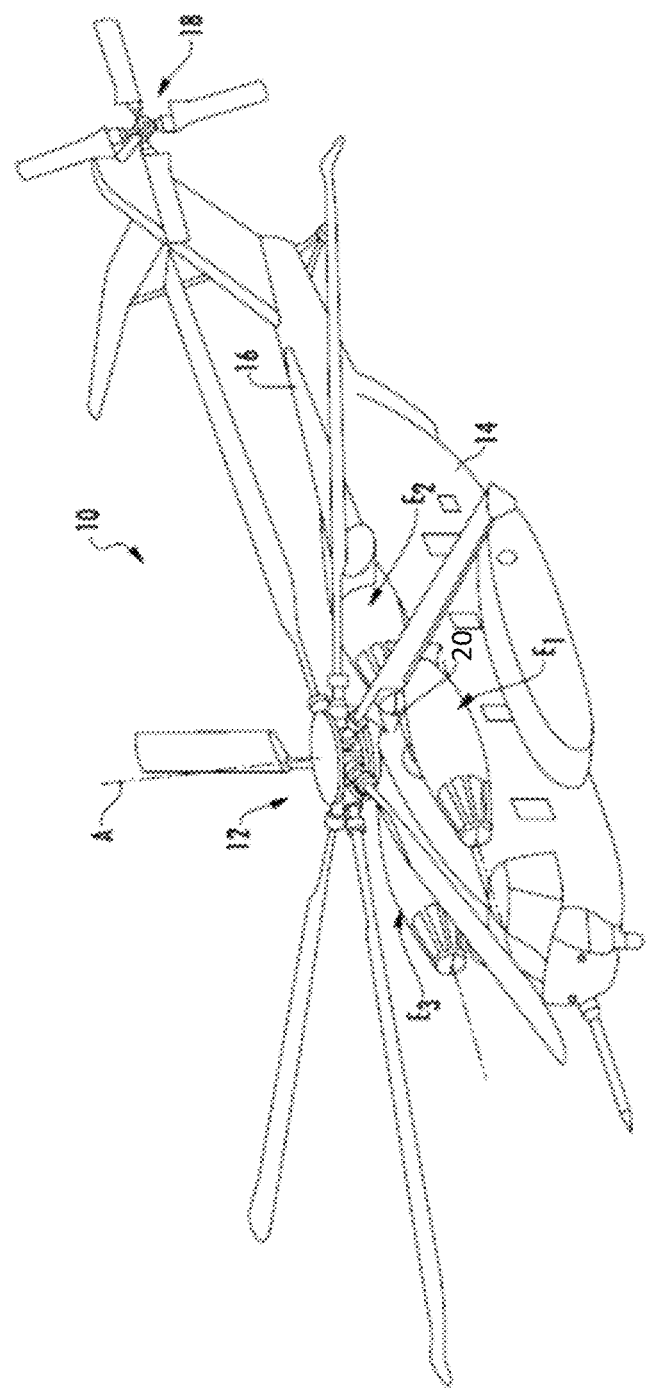
FIG. 1 is a schematic diagram of an example of a rotary wing aircraft.

FIG. 1 schematically illustrates a rotary-wing aircraft 10 having a main rotor system 12. The aircraft 10 includes an airframe 14 having an extending tail 16 which mounts a tail rotor system 18, such as an anti-torque system, a translational thrust system, a pusher propeller, or a rotor propulsion system for example. Power is transferred from one or more engines E to a power transmission gearbox 20 (see FIGS. 2a and 2b), to drive the main rotor system 12 about a respective axis of rotation A. Although a particular rotary wing aircraft configuration is illustrated and described in the disclosed embodiment, other configurations and/or machines, such as a high speed compound rotary wing aircraft with supplemental translational thrust systems, a dual contra-rotating, coaxial rotor system aircraft, and a turbo-prop, tilt-rotor or tilt-wing aircraft for example, will also benefit from the present invention.

Figure 2:
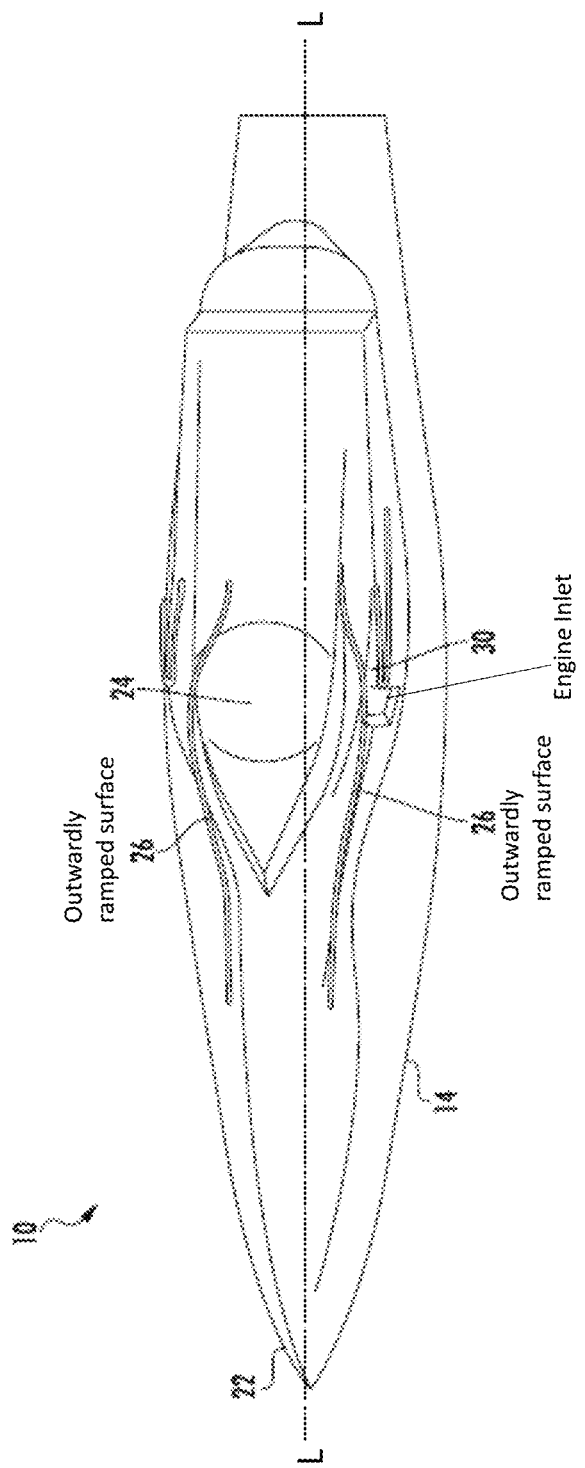
FIG. 2. is a perspective view of a portion of an airframe of a rotary wing aircraft according to an embodiment.

With reference now to FIG. 2, the airframe 14 is illustrated in more detail. In an embodiment, the airframe 14 is shaped to passively meter the air flow entering a partially submerged engine inlet 30. As shown, the airframe 14 is generally narrow adjacent a front end 22 where the cockpit is disposed. The width of the airframe 14 gradually increases along a longitudinal axis L of the aircraft 10 between the front end 22 and the location of the pylon 24 for supporting the main rotor system 12. In an embodiment, the width of the airframe 14 is greatest at a position that intersects the rotational axis of the main rotor system 12. One or more engines E (not shown in FIG. 2) may be mounted within the airframe 14 such that an inlet 30 of the engine is generally aligned with, or offset slightly downstream from the main rotor pylon 24. The engine inlet 30 may be partially submerged within the airframe 14 (best shown in FIGS. 3 and 4). Further, the contours 26 formed in the side of the airframe 14 generally upstream from the main rotor pylon 24 may be ramped outwardly to initiate air flow in a direction diverted at least partially away from the engine inlet 30.

Figure 3:
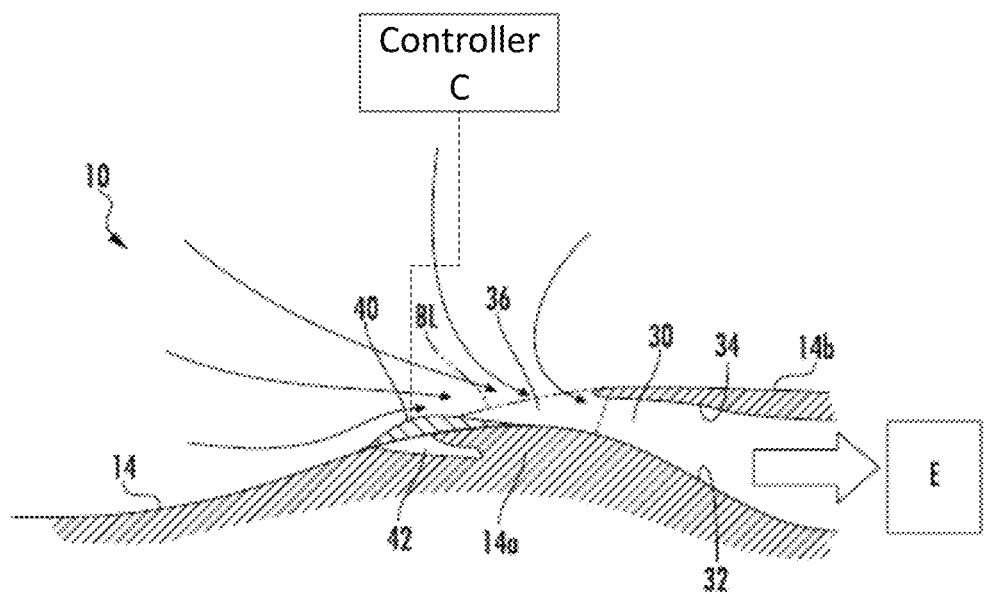
FIG. 3 is a cross-sectional view of an engine inlet of the airframe including a deflector in a first position according to an embodiment.
Figure 4:
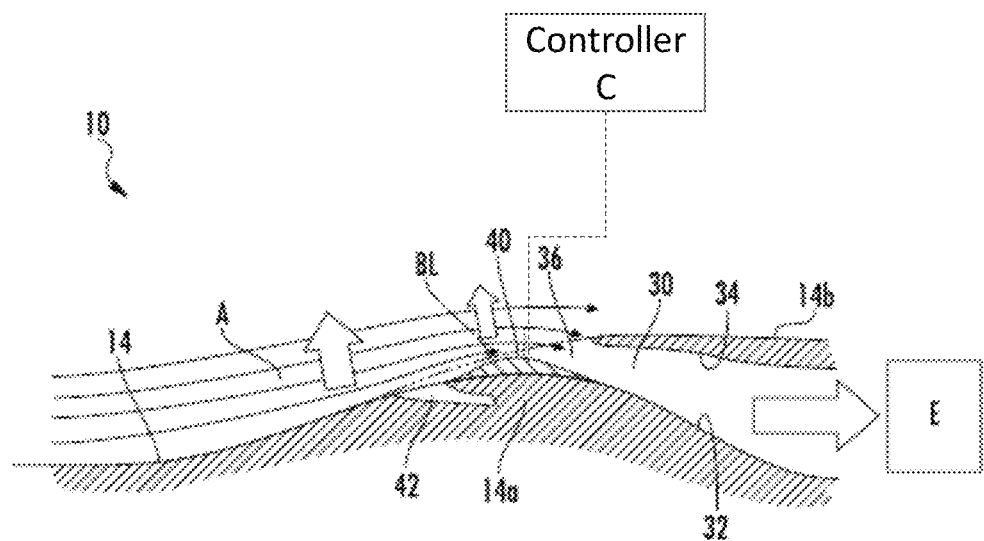
FIG. 4 is a cross-sectional view of an engine inlet of the airframe including a deflector in a second position according to an embodiment.

With reference now to FIGS. 3 and 4, a cross-section of an engine inlet 30 is illustrated in more detail. As previously described, the engine inlet 30 is partially submerged within the airframe 14. In the partially submerged configuration, a first portion of the airframe 14a defines an interior wall 32 of the engine inlet 30, and a second portion of the airframe 14b, offset from the first portion 14a, defines an exterior wall 34 of the engine inlet 30. The gap formed between the first portion 14a and the second portion 14b defines the opening 36 of the engine inlet 30. The first and second portions of the airframe 14a, 14b may have complementary shapes such that the flow contour line defined by the first and second portions 14a, 14b is generally smooth and gradual. Accordingly, the contours of the first and second portions 14a, 14b are intended to reduce and/or minimize the drag across the exterior of the airframe 14. In an embodiment, a throat of the engine inlet 30, defined as the minimum distance between the interior and exterior surfaces 32, 34, is sized to maximize performance of the engine E during hover and take-off flight conditions.

Alternatively, or in addition to the passive metering performed by the airframe 14, the air flow into the engine inlet 30 may be actively controlled. In an embodiment, a deflector 40 is mounted to an exterior surface of the airframe 14, upstream from the engine inlet 30. The deflector 40 is configured to move, for example translate or slide, between a first position (illustrated in FIG. 3) and a second position (illustrated in FIG. 4) along the longitudinal axis L of the aircraft 10. The first and second positions as described herein are end positions of the movement of the deflector 40. However, it should be understood that the deflector 40 may also be arranged at any position between the first and second position. In an embodiment, the deflector 40 is configured to move along a track formed in the airframe 14, such as via operation of an electromechanical actuator coupled thereto for example. However, other suitable mechanisms for adjusting the position of the deflector 40 relative to the airframe 14 are also contemplated herein.

The deflector 40 has a smooth contour. In an embodiment, the deflector 40 is contoured such that when in the second position, a tangent at the peak of the deflector 40 is oriented generally parallel to the longitudinal axis L. The throat of the engine inlet 30 is arranged normal to the incoming air stream. Accordingly, when the deflector 40 is in the second position, a virtual throat of the engine inlet 30 is defined forward of the engine inlet due to the change in the direction of the airstream caused by the positioning and contour of the deflector 40.

In addition, the contour of the deflector 40 is configured to extend beyond the plane of the boundary layer BL when in the first position. In the second position, however, the deflector 40 does not extend beyond the boundary layer BL. In the illustrated non-limiting embodiment, the deflector 40 has a gradual, generally convex curvature. It should be understood that the illustrated deflector 40 is intended as an example only.

The deflector 40 is coupled to the airframe 14 generally adjacent a boundary layer diverter cavity 42. The boundary layer diverter cavity 42 is configured to actively or passively scavenge boundary flow and divert it into a bypass cavity to prevent the boundary flow from entering the engine inlet 30. In the first position, the deflector 40 is configured to at least partially, or completely, cover the boundary layer diverter cavity 42. However, in the second position, the deflector 40 is spaced away from the boundary layer diverter cavity 42, and therefore does not interfere with the air being drawn into the boundary layer diverter cavity 42. When the deflector 40 is in the second position and the boundary layer diverter cavity 42 is fully operational, air drawn into the cavity 42 may be redirected to the engine bay cooling system.

During take-off and hover operations of the aircraft 10, inlet air is pulled hemi-spherically into the throat of the engine inlet 30. The deflector 40 is configured to move between the first position and the second position to continuously modulate the amount of air flow into the engine inlet 30 in response to the flight condition of the aircraft 10. The deflector 40 may be moved automatically, such as via a controller, or alternatively, may be moved in response to a pilot command. When the aircraft 10 is in a take-off or hover flight condition, the deflector 40 may be arranged at or near the first position. In the first position, the deflector 40 is located as far upstream from the engine inlet 30 as possible, such that the deflector 40 does not interfere with or restrict the amount/mass flow of air provided to the engine inlet 30.

As the speed of the aircraft 10, and therefore the mass flow of the air provided to the engine inlet 30 increases, the deflector 40 is configured to transition in an aft direction towards the second position. The incoming air coalesces into a narrowed stream, illustrated schematically at A, and enters the inlet 30 from a direction generally aligned with the flight path and normal to the inlet 30. The contour of the airframe 14 adjacent the main rotor pylon 24 and forward of the engine inlet 30 gradually directs the air flow along an "S-shaped" path, away from the partially submerged engine inlet 30. As a result, the inertial properties of the air cause a portion of the air flow to bypass the engine inlet 30. In addition, as the deflector 40 transitions aft of the boundary layer BL, the boundary layer diverter cavity 42 is exposed, thereby allowing the scavenging system to remove any boundary layer air growth that has accumulated along the forward portion of the airframe 14 prior to entry into the engine inlet 30.

The deflector allows the area of the engine inlet to be adjusted to match the velocity of the aircraft 10. Accordingly, a larger engine inlet area may be provided when the aircraft is operated at lower speeds, and a smaller engine inlet area is provided when the aircraft is operated at higher speeds. The variation in the engine inlet geometry reduces drag, thereby improving fuel consumption and power of the engine.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. An aircraft comprising:
   an airframe having a boundary layer diverter cavity formed therein;
   an engine mounted to the airframe;
   an engine inlet for receiving an ambient airflow and providing the ambient airflow to the engine, wherein an amount of airflow provided to the engine inlet is controllable; and
   a deflector movable relative to the airframe between a first position and a second position to adjust an inlet area of the engine inlet and to control operation of the boundary layer diverter cavity;
   wherein the airframe includes an outwardly ramped surface arranged upstream from the engine inlet, the ramped surface being operable to direct a portion of the ambient flow away from the engine inlet.

2. The aircraft of claim 1, wherein the amount of airflow provided to the engine inlet is controllable based on a flight condition of the aircraft.

3. The aircraft of claim 1, wherein an inlet area of the engine inlet is variable.

4. The aircraft of claim 1, wherein the deflector is mounted to the airframe upstream from the engine inlet.

5. The aircraft of claim 1, wherein the first position of the deflector is upstream from the second position of the deflector relative to the airflow.

6. The aircraft of claim 1, wherein the deflector is operable in response to a pilot command.

7. The aircraft of claim 1, wherein the deflector is operable automatically by a controller in response to a speed of the aircraft.

8. The aircraft of claim 1, wherein airflow to the engine inlet is maximized when the deflector is in the first position.

9. The aircraft of claim 1, wherein airflow to the engine inlet is minimized when the deflector is in the second position.

10. The aircraft of claim 1, wherein when the deflector is in the first position, airflow into the boundary layer diverter cavity is substantially blocked and the boundary layer diverter cavity is non-operational.

11. The aircraft of claim 1, wherein when the deflector is in the second position, the deflector is separated from the boundary layer diverter cavity airflow such that the boundary layer diverter cavity is fully operational.

12. The aircraft of claim 1, wherein the engine inlet is partially submerged within the airframe.

13. A method of operating an aircraft, comprising:
   directing a first portion of an airflow away from an engine inlet via an outwardly ramped surface of an airframe arranged upstream from the engine inlet;
   directing a second portion of the airflow towards the engine inlet;
   directing a third portion of the airflow towards a boundary layer diverter cavity formed in the airframe;
   determining a flight condition of the aircraft; and
   controlling the second portion of the airflow entering the engine inlet and the third portion of the airflow entering the boundary layer diverter cavity in response to the determined flight condition, wherein controlling the second portion and the third portion includes moving a deflector mounted to the airframe between a first position and a second position.

14. The method of claim 13, wherein controlling the airflow entering the engine inlet includes varying an inlet area of the engine inlet.

* * * * *